United States Patent
Lewis et al.

(10) Patent No.: US 9,689,969 B2
(45) Date of Patent: Jun. 27, 2017

(54) DOPPLER RADAR TEST SYSTEM

(71) Applicant: The Boeing Company, Seal Beach, CA (US)

(72) Inventors: Dennis M. Lewis, Mill Creek, WA (US); Wayne L. Cooper, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 532 days.

(21) Appl. No.: 14/172,021

(22) Filed: Feb. 4, 2014

(65) Prior Publication Data

US 2015/0219752 A1    Aug. 6, 2015

(51) Int. Cl.
*G01S 7/40*    (2006.01)

(52) U.S. Cl.
CPC .............. *G01S 7/40* (2013.01); *G01S 7/4052* (2013.01); *G01S 2007/4095* (2013.01)

(58) Field of Classification Search
CPC ................. G01S 2007/4082; G01S 2007/4095
USPC ......................................................... 342/104
See application file for complete search history.

(56) References Cited

U.S. PATENT DOCUMENTS

| 2,935,701 A | 5/1960 | Robinson et al. |
| 3,365,710 A | 1/1968 | Williams |
| 3,745,579 A * | 7/1973 | Lott .......................... G01S 7/40 342/171 |
| 3,935,573 A | 1/1976 | Johnson |
| 4,283,725 A | 8/1981 | Chisholm |
| 4,656,481 A | 4/1987 | Mawhinney |
| 6,067,041 A | 5/2000 | Kaiser et al. |

(Continued)

FOREIGN PATENT DOCUMENTS

| GB | 2221590 A | * | 2/1990 | ........... G01S 7/4052 |
| GB | 2464780 A | * | 5/2010 | ............. G01S 7/032 |

OTHER PUBLICATIONS

Allan et al., "Calibration of Police Radar Instruments," May 1976, Reprinted from NBS Special Publication 442, (From Report of the 60th National Conference on Weights and Measures 1975), pp. 42-47.

(Continued)

*Primary Examiner* — Tashiana Adams
*Assistant Examiner* — Helena Seraydaryan
(74) *Attorney, Agent, or Firm* — Womble Carlyle Sandridge & Rice LLP

(57) ABSTRACT

A system is provided that includes a Doppler radar unit that transmits a first electromagnetic wave having a first frequency, which a test system converts to a first electrical signal having the first frequency. The test system generates a second electrical signal having a second frequency, and mixes the first and second electrical signals to produce a third electrical signal having a third, sum or difference frequency. The third frequency represents a Doppler-shifted frequency caused by reflection of the first electromagnetic wave by a target at a distance from the Doppler radar unit. The test system converts the third electrical signal to a second electromagnetic wave having the third frequency, and transmits the second electromagnetic wave back to the Doppler radar unit for calculation of a speed representing that of the target as a function of the first and third frequencies, from which the Doppler radar unit may be calculated/certified.

15 Claims, 3 Drawing Sheets

(56) References Cited

U.S. PATENT DOCUMENTS

| | | | |
|---|---|---|---|
| 6,114,985 A | 9/2000 | Russell et al. | |
| 6,496,139 B1 | 12/2002 | Flacke et al. | |
| 8,884,664 B1* | 11/2014 | Bradley | H03B 19/00 |
| | | | 327/115 |
| 2005/0128134 A1* | 6/2005 | Shinoda | H01Q 1/3233 |
| | | | 342/70 |
| 2005/0285774 A1 | 12/2005 | Wittenberg et al. | |
| 2011/0148710 A1* | 6/2011 | Smid | G01S 13/84 |
| | | | 342/394 |
| 2013/0106647 A1 | 5/2013 | Yu | |

OTHER PUBLICATIONS

Lendrum, "Calibration of Doppler Radar Using Tuning Forks," Sep. 1, 1968, Department of Computer Science, University of Illinois, 64 pages.

Stockman et al., "Doppler Radar Detection of Mechanically Resonating Objects," Copyright 2005, Antennas and Propagation Society International Symposium, vol. 4B, pp. 130-133.

European Search Report for Application No. 15153773.5 dated Jun. 15, 2015.

\* cited by examiner

DOPPLER RADAR TEST SYSTEM

TECHNOLOGICAL FIELD

The present disclosure relates generally to Doppler radar and, in particular, to a test system for a Doppler radar unit.

BACKGROUND

Doppler radar is a type of radar system that uses electromagnetic waves to determine radial velocity of a target at a distance from an observer (speed toward/away from an observer), and it has a number of uses including determining the rate of descent of aircraft, the speed of moving objects and the like. A Doppler radar unit generally transmits an electromagnetic wave (sometimes referred to as a radar signal) that reflects off a target and returns to the radar unit. Movement of the target in a radial direction relative to the radar unit causes a change in the frequency of the reflected signal relative to the transmitted signal, often referred to as the Doppler effect (or Doppler shift). More specifically, the radial movement of the target changes the frequency of the radar signal an amount that is proportional to the relative velocity of the target such that the change in frequency of the radar signal may be used to determine the location and speed of the moving target.

A number of techniques have been developed to calibrate and certify Doppler radar units, most notably those involving use of a vibrating tuning fork. According to this technique, the tuning fork produces a signal representing that caused by reflection of a radar signal by a target (i.e., the tuning fork produces a signal representing a reflected signal), and which has a known relationship to an expected speed of the target. The radar unit responds to the signal by calculating a speed, which may be compared to the expected speed to determine the accuracy of the radar unit. And from this comparison, the radar unit may be calibrated or otherwise certified for use.

Although the existing tuning fork technique is adequate, it has drawbacks. The current tuning fork technique process generally only tests a single point, namely the single frequency of the signal produced by the tuning fork. The tuning fork itself may also be prone to changes do to temperature and physical damage due to striking the fork too hard on a solid surface. Other existing techniques include use of a vehicle and stationary reflector or a moving object, but these techniques are generally less accurate and stable. These and other similar existing techniques are also typically inadequate for calculating very low speeds, particularly in the case of rates of descent.

Therefore, it may be desirable to have a system and method that takes into account at least some of the issues discussed above, as well as possibly other issues.

BRIEF SUMMARY

Example implementations of the present disclosure are generally directed to an improved system and method for producing a Doppler-shifted frequency representing that caused by reflection of a radar signal by a target, which may be used to calculate a speed representing that of the target for calibrating or certifying a Doppler radar unit. According to example implementations, the Doppler-shifted frequency may be produced from an electrical signal at the frequency of the Doppler radar unit by producing another, second electrical signal at a second frequency and mixing the two electrical signals. In this manner, example implementations may produce a more-accurate second frequency set closer to that of the Doppler radar unit, which may thereby achieve a lower Doppler-shifted frequency. This may in turn enable calibration/certification of the Doppler radar unit for a lower target speed. And in some examples, the second frequency may be selectable, which may further enable example implementations to calibrate/certify the Doppler radar unit for a number of different target speeds.

According to one aspect of example implementations, a system is provided that includes a Doppler radar unit and a test system at a distance from the Doppler radar unit. The Doppler radar unit is configured to transmit a first electromagnetic wave having a first frequency. The test system, then, is configured to receive the first electromagnetic wave, and convert the first electromagnetic wave to a first electrical signal having the first frequency.

The test system is configured to generate a second electrical signal having a second frequency, and mix the first electrical signal and second electrical signal to produce a third electrical signal having a third frequency that is a sum of or difference between the second frequency and first frequency. In some examples, the test system may be configured to generate a sinusoidal audio signal as the second electrical signal. And in some examples, the test system may be configured to generate the second electrical signal having a second frequency that is selectable over a range of frequencies.

Here, the third frequency of the third electrical signal represents a Doppler-shifted frequency caused by reflection of the first electromagnetic wave by a target at a distance from the Doppler radar unit. The test system may be configured to then convert the third electrical signal to a second electromagnetic wave having the third frequency, and transmit the second electromagnetic wave back to the Doppler radar unit. The Doppler radar unit may be configured to then calculate a speed representing that of the target as a function of the first frequency and third frequency. The Doppler radar unit may then be calibratable or certifiable based on a comparison of the speed calculated by the Doppler radar unit and an expected speed.

The Doppler radar unit may include a first antenna configured to transmit the first electromagnetic wave, and the same or another first antenna configured to receive the second electromagnetic wave. Similarly, the test system may include a second antenna coupled to its platform and configured to receive the first electromagnetic wave, and the same or another second antenna configured to transmit the second electromagnetic wave. In some examples, the Doppler radar unit and test system may include radar-absorbent material disposed about the respective ones of the first and second antennas, and configured to reduce reflections of respective ones of the second and first electromagnetic waves from receipt thereby.

In other aspects of example implementations, a test system and method are provided. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
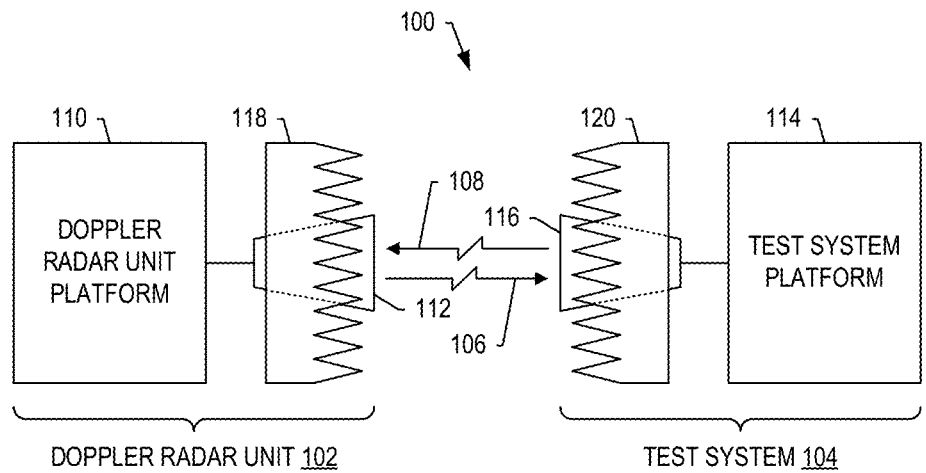
FIG. 1 illustrates a system according to some example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Further, although reference may be made herein to a number of measures, thresholds and the like such as times, distances, speeds, percentages and the like, according to which aspects of example implementations may operate; unless stated otherwise, any or all of the measures/thresholds may be configurable. Like reference numerals refer to like elements throughout.

FIG. 1 illustrates a system 100 according to some example implementations of the present disclosure. As shown, the system includes a Doppler radar unit 102 and a test system 104 at a distance from the Doppler radar unit. The Doppler radar unit is configured to transmit a first electromagnetic wave 106 having a first frequency. The test system, then, is configured to receive the first electromagnetic wave, and convert the first electromagnetic wave to a first electrical signal having the first frequency.

The test system 104 is configured to generate a second electrical signal having a second frequency, and mix the first electrical signal and second electrical signal to produce a third electrical signal having a third frequency that is the sum of or difference between the second frequency and first frequency. In some examples, the test system may be configured to generate a sinusoidal audio signal as the second electrical signal. And in some examples, the test system may be configured to generate the second electrical signal having a second frequency that is selectable over a range of frequencies.

Regardless of the manner by which the test system 104 is configured to generate the second electrical signal, the third frequency of the third electrical signal represents a Doppler-shifted frequency caused by reflection of the first electromagnetic wave 106 by a target at a distance from the Doppler radar unit 102. The test system may be configured to then convert the third electrical signal to a second electromagnetic wave 108 having the third frequency, and transmit the second electromagnetic wave back to the Doppler radar unit. In some examples, the Doppler radar unit may receive the second electromagnetic wave, and convert it to an appropriate (e.g., fourth) electrical signal having the third frequency for further processing such as to calculate a speed representing that of the target.

As also shown, the Doppler radar unit 102 may include a platform 110 with various onboard components configured to carry various functions of the Doppler radar unit. The Doppler radar unit may also include a first antenna 112 coupled to its platform and configured to transmit the first electromagnetic wave 106, and the same or another first antenna may be configured to receive the second electromagnetic wave 108. Similarly, the test system 104 may include a platform 114 with various onboard components configured to carry various functions of the test system. And the test system may include a second antenna 116 coupled to its platform and configured to receive the first electromagnetic wave, and the same or another second antenna may be configured to transmit the second electromagnetic wave.

In some examples, the Doppler radar unit 102 may include a radar-absorbent material 118 disposed about the first antenna 112 and configured to reduce reflections of the second electromagnetic wave 108 from receipt thereby. Similarly, the test system 104 may include a radar-absorbent material 120 disposed about the second antenna 116 and configured to reduce reflections of the first electromagnetic wave 106 from receipt thereby.

Upon receipt of the second electromagnetic signal 108 having the third frequency, the Doppler radar unit 102 may be configured to calculate the speed representing that of the target. More particularly, the Doppler radar unit may calculate the speed representing that of the target as a function of the first frequency of the first electromagnetic signal 106, and the third frequency of the second electromagnetic signal. And the Doppler radar unit may be calibrated or certified (or calibratable or certifiable) based on a comparison of the calculated speed and an expected speed. For example, the (first) frequency of the Doppler radar unit may be aligned with a standard frequency source. In this example, a counter circuit of the Doppler radar unit may then be aligned to measure the correct returning (third) frequency.

In some examples, the Doppler radar unit 102 may be configured to calculate the speed of the target according to the Doppler equation, which may be approximated as follows:

$$|f - f_0| = \Delta f \approx \frac{2\upsilon}{c} f_0$$

In the preceding, f represents the third frequency that is the sum of or difference between the second frequency and first frequency $f_0$, and $\Delta f$ represents the beat frequency (Doppler frequency) that is the difference between the third frequency f and first frequency $f_0$. Also in the preceding, $\upsilon$ represents the speed of the target, and c represents the velocity of electromagnetic waves in the medium between the antennas 112, 116. This equation may then be rewritten to calculate the velocity $\upsilon$ represents the speed of the target as follows:

$$\upsilon \approx \frac{\Delta f}{2 f_0} c$$

As indicated above, as the second frequency comes from an electrical signal produced by the test system 104, it may be more accurate and set closer to the first frequency of the Doppler radar unit 102, which may thereby achieve a lower Doppler-shifted (third) frequency. This may in turn enable the system 100 to calibrate/certify the Doppler radar unit for a lower target speed. And in examples in which the second frequency is selectable over a range of frequencies, the system may be able to calibrate/certify the Doppler radar unit for a number of different target speeds.

Figure 2:
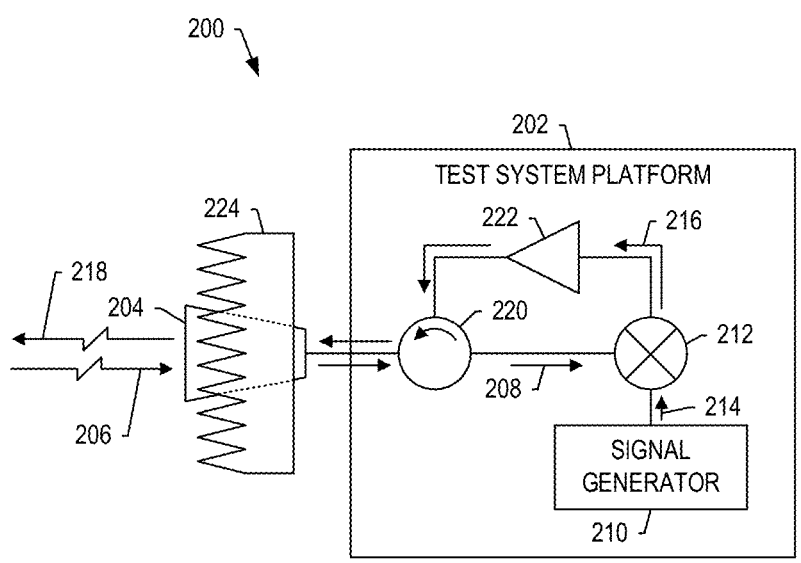
FIG. 2 illustrates an example of a test system, which in some examples may correspond to that of the system of FIG. 1.

FIG. 2 illustrates an example of a test system 200, which in some examples may correspond to the test system 104 of the system 100 of FIG. 1. As shown, the test system includes a platform 202 (e.g., platform 114) and an antenna 204 (e.g., antenna 116) coupled to the platform. The antenna is configured to receive a first electromagnetic wave 206 having a first frequency from a Doppler radar unit at a distance from the test system 200, such as first electromagnetic wave 106 from Doppler radar unit 102. The antenna may be configured to convert the first electromagnetic wave to a first electrical signal 208 having the first frequency.

The platform 202 may include various onboard components configured to carry various functions of the test system 200. For example, the platform may include a signal generator 210 and mixer 212. The signal generator is configured to generate a second electrical signal 214 having a second frequency, and the mixer is a mixer configured to mix the first electrical signal 208 and second electrical signal to produce a third electrical signal 216 having a third frequency that is the sum of or difference between the second frequency and first frequency. In some examples, the signal generator may be configured to generate a sinusoidal audio signal as the second electrical signal. And in some examples, the signal generator may be configured to generate the second electrical signal having a second frequency that is selectable over a range of frequencies.

Similar to before with respect to FIG. 1, the third frequency of the third electrical signal 216 represents a Doppler-shifted frequency caused by reflection of the first electromagnetic wave 206 by a target at a distance from the Doppler radar unit (e.g., Doppler radar unit 102). The antenna 204 may be further configured to convert the third electrical signal to a second electromagnetic wave 218 having the third frequency, and transmit the second electromagnetic wave back to the Doppler radar unit for calculation of a speed representing that of the target as a function of the first frequency and third frequency. Again, the Doppler radar unit may be calibrated or certified based on a comparison of the calculated speed and an expected speed.

The test system 200 may include separate antennas 204 one of which may be configured to receive the first electromagnetic wave 206, and another configured to transmit the second electromagnetic wave 218. Or the same antenna may be configured to both receive the first electromagnetic wave, and transmit the second electromagnetic wave. In some examples, then, the platform 202 may further include a duplexer 220, which may be implemented by or include various components such as a circulator, directional coupler, isolator or the like, and which may be configured to route the first electrical signal 208 from the antenna to the mixer 212, and route the third electrical signal 216 from the mixer to the antenna. As also shown, the platform may include an amplifier 222 configured to amplify the third electrical signal before conversion of the third electrical signal to the second electromagnetic wave by the antenna. And in some examples, the test system may further include a radar-absorbent material 224 disposed about the antenna and configured to reduce reflections of the first electromagnetic wave from receipt by the antenna.

Figure 3:
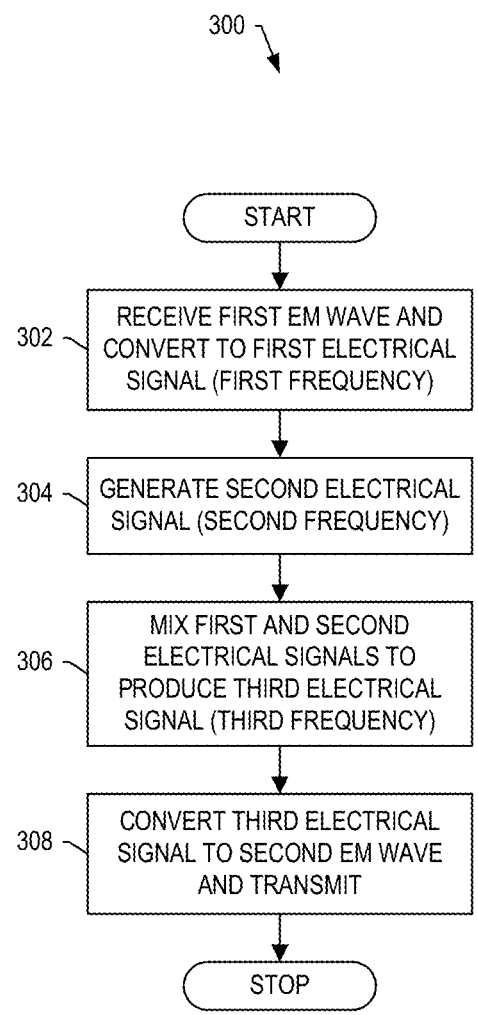
FIG. 3 illustrates a flowchart including various operations in a method according to example implementations of the present disclosure.

FIG. 3 illustrates a flowchart including various operations in a method 300 according to example implementations of the present disclosure. As shown at block 302, and with reference to the system 100 of FIG. 1 for example, the method includes receiving a first electromagnetic (EM) wave 106 having a first frequency, and converting the first electromagnetic wave to a first electrical signal having the first frequency, with the first electromagnetic wave being received at a test system 104 from a Doppler radar unit 102 at a distance therefrom. The method also includes generating a second electrical signal having a second frequency, and mixing the first electrical signal and second electrical signal to produce a third electrical signal having a third frequency that is the sum of or difference between the second frequency and first frequency, as shown at blocks 304, 306. Here again, the third frequency represents a Doppler-shifted frequency caused by reflection of the first electromagnetic wave by a target at a distance from the Doppler radar unit. And the method includes converting the third electrical signal to a second electromagnetic wave having the third frequency, and transmitting the second electromagnetic wave from the test system back to the Doppler radar unit for calculation of a speed representing that of the target as a function of the first frequency and third frequency, as shown at block 308.

Figure 4:
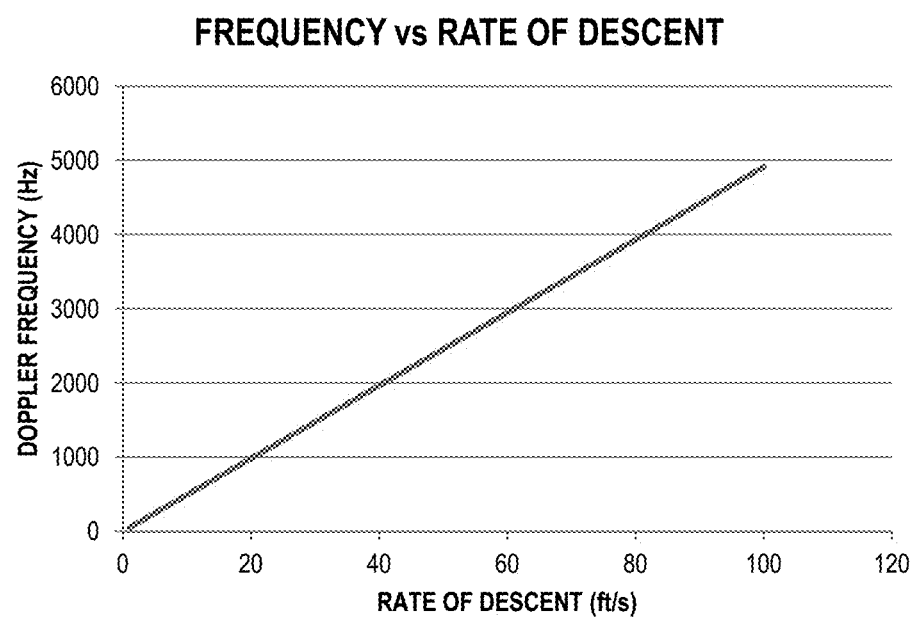
FIG. 4 is a graph illustrating an example of a known relationship between Doppler frequency and rate of descent of a target aircraft, according to some examples of the present disclosure.

To further illustrate example implementations of the present disclosure, FIG. 4 illustrates a graph showing an example known relationship between Doppler or Doppler-shifted frequency (third frequency) and rate of descent (expected speed) of a target aircraft. The relationship shown in this example assumes a Doppler radar unit 102 having a frequency $f_0$=24.150 GHz, and that the velocity in the medium between antennas 112, 116 is approximately the speed of light c=983,571,056.4 ft/s.

According to example implementations, the Doppler-shifted frequency may be produced from an electrical signal at the frequency of the Doppler radar unit by producing another, second electrical signal at a second frequency and mixing the two electrical signals. In this manner, example implementations may produce a more-accurate second frequency set closer to that of the Doppler radar unit, which may thereby achieve a lower Doppler-shifted frequency and calibration/certification of the Doppler radar unit for a lower target speed. In the example of FIG. 4, example implementations may be able to achieve Doppler-shifted frequencies and target speeds down to 49 Hz and 10 ft/s or less. And in some examples, the second frequency may be selectable, which may further enable example implementations to calibrate/certify the Doppler radar unit for a number of different target speeds, such as over a range of 1 to 100 ft/s in the example of FIG. 4.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
    a Doppler radar unit configured to transmit a first electromagnetic wave having a first frequency; and
    a test system at a distance from the Doppler radar unit, the test system being configured to receive the first electromagnetic wave, and convert the first electromagnetic wave to a first electrical signal having the first frequency,
        wherein the test system is configured to generate a sinusoidal audio signal as a second electrical signal having a second frequency, and mix the first electrical signal and second electrical signal to produce a third electrical signal having a third frequency that is a sum of or difference between the second frequency and first frequency, the third frequency representing a Doppler-shifted frequency caused by reflection of the first electromagnetic wave by a target at a distance from the Doppler radar unit,
        wherein the test system is configured to convert the third electrical signal to a second electromagnetic wave having the third frequency, and transmit the second electromagnetic wave back to the Doppler radar unit, and
    wherein the Doppler radar unit is configured to calculate a speed representing that of the target as a function of the first frequency and third frequency.

2. The system of claim 1, wherein the test system is configured to generate the second electrical signal having a second frequency that is selectable over a range of frequencies.

3. The system of claim 1, wherein the Doppler radar unit includes a first antenna configured to transmit the first electromagnetic wave and receive the second electromagnetic wave, and the test system includes a second antenna configured to receive the first electromagnetic wave, and transmit the second electromagnetic wave.

4. The system of claim 3, wherein the Doppler radar unit includes a radar-absorbent material disposed about the first antenna and configured to reduce reflections of the second electromagnetic wave from receipt thereby, and the test system includes a radar-absorbent material disposed about the second antenna and configured to reduce reflections of the first electromagnetic wave from receipt thereby.

5. The system of claim 1, wherein the Doppler radar unit is calibratable or certifiable based on a comparison of the speed calculated by the Doppler radar unit and an expected speed.

6. A test system comprising:
    an antenna configured to receive a first electromagnetic wave having a first frequency, and convert the first electromagnetic wave to a first electrical signal having the first frequency, the antenna being configured to receive the first electromagnetic wave from a Doppler radar unit at a distance from the test system;
    a signal generator configured to generate a second electrical signal having a second frequency, the signal generator being an audio signal generator configured to generate a sinusoidal audio signal as the second electrical signal; and
    a mixer configured to mix the first electrical signal and second electrical signal to produce a third electrical signal having a third frequency that is a sum of or difference between the second frequency and first frequency, the third frequency representing a Doppler-shifted frequency caused by reflection of the first electromagnetic wave by a target at a distance from the Doppler radar unit,
    wherein the antenna is further configured to convert the third electrical signal to a second electromagnetic wave having the third frequency, and transmit the second electromagnetic wave back to the Doppler radar unit for calculation of a speed representing that of the target as a function of the first frequency and third frequency.

7. The test system of claim 6, wherein the signal generator is configured to generate the second electrical signal having a second frequency that is selectable over a range of frequencies.

8. The test system of claim 6 further comprising:
    a duplexer configured to route the first electrical signal from the antenna to the mixer, and route the third electrical signal from the mixer to the antenna.

9. The test system of claim 6 further comprising:
    an amplifier configured to amplify the third electrical signal before conversion of the third electrical signal to the second electromagnetic wave by the antenna.

10. The test system of claim 6 further comprising:
    a radar-absorbent material disposed about the antenna and configured to reduce reflections of the first electromagnetic wave from receipt by the antenna.

11. A method comprising:
    receiving a first electromagnetic wave having a first frequency, and converting the first electromagnetic wave to a first electrical signal having the first frequency, the first electromagnetic wave being received at a test system from a Doppler radar unit at a distance therefrom;
    generating a sinusoidal audio signal as a second electrical signal having a second frequency;
    mixing the first electrical signal and second electrical signal to produce a third electrical signal having a third frequency that is a sum of or difference between the second frequency and first frequency, the third frequency representing a Doppler-shifted frequency caused by reflection of the first electromagnetic wave by a target at a distance from the Doppler radar unit; and
    converting the third electrical signal to a second electromagnetic wave having the third frequency, and transmitting the second electromagnetic wave from the test system back to the Doppler radar unit for calculation of a speed representing that of the target as a function of the first frequency and third frequency.

12. The method of claim 11, wherein generating the second electrical signal includes generating the second electrical signal having a second frequency that is selectable over a range of frequencies.

13. The method of claim 11 performed for each of a plurality of second electrical signals having different, respective second frequencies.

14. The method of claim 11 further comprising:
    calculating the speed representing that of the target as a function of the first frequency and third frequency, the speed being calculated at the Doppler radar unit.

15. The method of claim 14 further comprising:
    calibrating or certifying the Doppler radar unit based on a comparison of the speed calculated at the Doppler radar unit and an expected speed.

* * * * *